Figure 1:
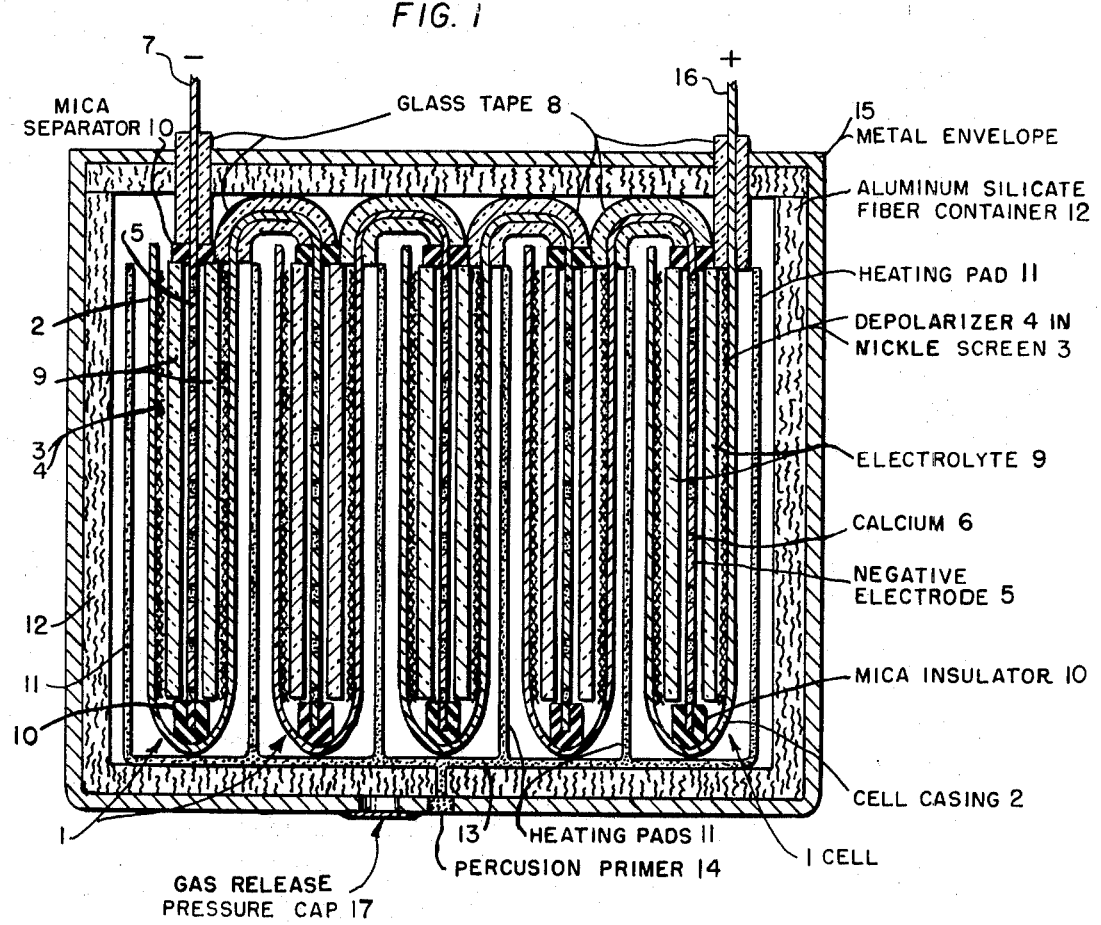

June 30, 1970     A. FISCHBACH     3,518,125

THERMAL BATTERIES

Filed May 11, 1962

*INVENTOR,*
*ADOLPH FISCHBACH.*
BY *Jack H Linscott*

ATTORNEY.

3,518,125
THERMAL BATTERIES
Adolph Fischbach, Elberon Park, N.J., assignor to the United States of America as represented by the Secretary of the Army
Filed May 11, 1962, Ser. No. 195,026
Int. Cl. H01m 1/06, 17/06
U.S. Cl. 136—90       4 Claims The invention described herein may be manufactured and used by or for the Government for governmental purposes without the payment of any royalty thereon.

This invention relates to thermal batteries. Thermal batteries have been defined by R. R. Goodrich and Richard C. Evans (Jr. of Electrochem Soc., vol. 9, August 1952, as electrochemical power supplies based upon electrolytes of various inorganic salts which remain solid and nonconductive at all storage temperatures. If these batteries are heated to relatively high temperatures (between 150° C. and 600° C.) the electrolyte melts, becomes conductive and electrical energy may then be withdrawn from the system.

The negative electrodes of thermal cells consist usually of magnesium, calcium or certain alloys of lithium or other metals high in the electromotive series. The electrolytes of such cells are generally composed of alkali or alkaline earth chlorides, bromides and nitrates in various combinations. The depolarizer material usually consists of iron oxide, tungstic oxide, molybdenum trioxide, sodium or potassium zinc-chromate and similar insoluble oxidizing agents. Both the positive and the negative electrodes are usually made by applying the respective electrode materials into the holes of a metallic grid which may be made of silver, copper, nickel or iron.

Thermal batteries are used for special purpose applications, for instance, as power sources in guided missiles, because of their exceptional shelf stability, temperature range and ruggedness as well as their high electrical output per unit weight and volume. For such special purpose applications the thermal battery is usually built up of about 10 to 12 flat cells each cell being inclosed in a thin sheet metal casing made, for instance, of nickel. The individual cell is usually 2-4 inches wide, 5-7 inches tall and ¼ inch thick. The required number of such thermal cells is connected in series with insulating heating pads sandwiched in between the cells. At the desired moment the heating pads are fired, e.g., by a percussion primer, or an electric match. The fired heating pads supply the heat necessary to raise the temperature of the solid electrolyte above its melting point which may be from as low as 150° C. to 600° C. and even higher.

The insulating heating pad consists of a combination of electrical insulating material and a heat powder. After the heat powder has been burned the insulating material remains in the form of a continuous dielectric layer between the cells, electrically insulating them from one another.

The heat powder is based in well-known manner on a variety of exothermic chemical reactions while the insulating material may consist of ceramics, glass, asbestos, mica, etc. The battery is inclosed in an hermetically sealed container of relatively high mechanical strength. During the heating of the cells by firing the heating pads the pressure within the battery container rises very quickly to relatively very high pressures and the container has therefore to consist of pressure resistant material as, for instance cold-rolled steel.

The thickness of the steel container will of course depend on the size of the battery. For, the larger the surface area of the electrodes, the greater the pressure developed in heating the battery for the purpose of melting the electrolyte.

The sudden rise in pressure during melting of the electrolyte often causes bulging of the walls of the battery container, a deformation that is very undesirable in the applications of such batteries as a power source in guided missiles. Attempts to prevent this bulging by the provision of a blow-off vent have led to the discovery that release of the pressure at the time of the melting of the electrolyte greatly increases the overall capacity of the battery. It has been found that the release of pressure at that particular moment allows the escape of gas bubbles formed in the melting electrolyte and thus decreases the inner resistance of the cell. If too high a pressure within the container prevents the escape of these gas bubbles the inner resistance of the cells is greatly increased which of course leads to a markedly lower electrical performance of the battery.

According to the present invention the bulging of the container walls is prevented at the same time the overall capacity of the battery markedly increased by providing the steel container with a blow-off vent the mechanical strength of which is predetermined to allow a rupture of said vent at the pressure which is developed in the battery during melting of the electrolyte. Release of this pressure allows all gas bubbles to escape from the liquefied electrolyte thus markedly increasing the electrical capacity of the cell.

Figure 2:
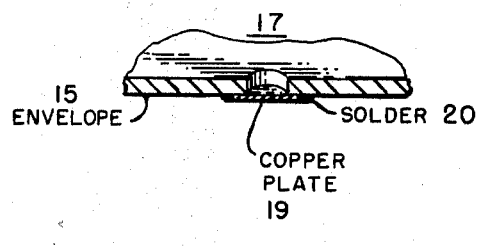

The invention will become more apparent from a description of a particular embodiment of the invention shown in the accompanying drawing, in which FIG. 1 shows an elevational cross-section of a thermal battery consisting of five cells, and FIG. 2 shows the special arrangement of the blow-off vent in the bottom of the battery container.

Each of the five flat cells 1 shown in FIG. 1 consists of a cell casing 2 made preferably of sheet nickel. Nickel screens 3 are spot-welded to the inside of the nickel casing 2. The depolarizing material 4 consisting preferably of a mixture of iron oxide, small amounts of a binder such as sodium silicate and enough water to make a paste which is pasted into the nickel screen 3 and then dried in an oven at about 200° F. The negative electrode 5 consists of perforated sheet nickel the holes of which are filled with calcium 6 as the negative electrodic material. The part of the negative terminal 7 that leads out of the cell casing 2 is covered with insulating material, e.g., glass tape 8. On both sides of the negative calcium electrode 5 there are provided solid electrolyte layers 9 composed, for instance, of a mixture of alkali chlorides and nitrates which remain solid and nonconductive at room temperature. The sheet nickel of the cell casing 2 of the first cell may be continuous with the negative electrode 5 of the neighboring cell but must be perforated in order to receive calcium 6 constituting the negative electrodic material. To prevent short-circuiting between negative electrode 5 and the bottom of the nickel casing 2 insulating parts 10 are provided at the lower end of the negative electrode 5.

Insulating heating pads 11 are provided between the cell 1 and also between the first and last cell and the container 12 consisting of heat resistant materials such as aluminum silicate fiber. All of the heating pads 11 are connected preferably at the bottom of the cells by a common heating pad 13 which can be ignited with the help of a percussion primer 14. The container 12 is hermetically sealed within the metal envelope 15. The free end 7 of the negative electrode 5 of the first cell and the free end 16 of the cell casing 2 of the last cell constitute respectively the negative and the positive electrode and are insulated with glass tape 8 from the metal envelope 15. According to the invention a gas release pressure cap 17 of predetermined mechanical strength covers an opening in the metal envelope 15 which opening is preferably arranged in the bottom of envelope 15. The gas release pressure cap 17 consists, as shown in FIG. 2 of a copper plate 19 soldered with solder 20 to metal envelope 15 in such a manner that the gas pressure evolved in the metal envelope 15, after firing of the heating pads 11 ruptures the copper plate 19 at about the time the electrolyte is being completely liquified.

The metal envelope 15 may preferably consist of cold-rolled steel. In a battery consisting of 12 cells having the dimensions of 3 x 3 x 5½" a 16-gauge cold-rolled steel was used, that is a steel having a thickness of about 0.060". In such a battery the pressure developed within the steel envelope after firing of the heating pads rose to about 600 p.s.i. The gas release pressure cap 17 was covered in this battery with a copper plate having a thickness of about 3 thousandths of an inch and was soldered to the metal envelope 15 with a solder consisting of 50% tin and 50% lead. The copper plate ruptured at about the time the electrolyte was being completely liquified and the pressure release allowed all gas bubbles to escape from the liquified electrolyte which markedly increased the electrical capacity of the cell.

The gas absorbed in the electrolyte results from various sources, particularly from residual moisture present in the electrode materials and from various reactions which may occur at the time the battery is heated.

The blow-off vent or blow-out port which pops off during battery activation may be provided in the top but is preferably located more conveniently in the bottom of the metal envelope. It may of course be provided in any other location depending on the shape of the battery.

Instead of a copper foil, a silver foil or any other appropriate metal foil may be soldered to the pressure release cap provided the mechanical strength of this foil is chosen so as to rupture at the appropriate time which allows the release of absorbed gas from the melting electrolyte.

The particular structure of the battery according to the invention prevents particles of the melting electrolyte to be ejected out of the battery envelope which could cause damage to adjacent complex electronic equipment.

It is obvious to those skilled in the art that many variations of the blow-off vent according to the invention are conceivable within the spirit of the invention defined in the appended claims.

What is claimed is:
1. A thermal battery comprising a solid electrolyte melting at temperatures between 150° C. and 600° C., the elements of said cell being hermetically sealed in a steel container said steel container having a vent, said vent being set to open at a predetermined pressure developed in the battery during melting of the electrolyte to allow all gas bubbles to escape from the electrolyte while it is melting.

2. A thermal battery according to claim 1 in which the vent consists of a metal foil soldered to an opening in the steel container in which the cells are hermetically sealed.

3. A thermal battery according to claim 2 in which the metal foil consists of copper.

4. A thermal battery according to claim 3 comprising a battery in which the pressure rises to about 600 p.s.i., said battery being contained in a steel container consisting of cold-rolled steel of about 0.060" thickness and said metal foil consisting of a copper foil of about 3 thousandths of an inch thickness.

References Cited
UNITED STATES PATENTS 2,679,547 5/1954 Fischbach et al. _____ 136—90
3,079,454 2/1963 McGinnis _____ 136—90 XR LELAND A. SEBASTIAN, Primary Examiner U.S. Cl. X.R.
136—177